(12) United States Patent
Kitayoshi

(10) Patent No.: US 6,275,181 B1
(45) Date of Patent: Aug. 14, 2001

(54) RADIO HOLOGRAM OBSERVATION APPARATUS AND METHOD THEREFOR

(75) Inventor: Hitoshi Kitayoshi, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/551,099

(22) Filed: Apr. 18, 2000

(30) Foreign Application Priority Data

Apr. 19, 1999 (JP) .................................................. 11-110334
Jun. 14, 1999 (JP) .................................................. 11-166485

(51) Int. Cl.[7] .................................................. G01S 13/00
(52) U.S. Cl. .................................................. 342/74
(58) Field of Search .................................... 343/850, 853; 342/360, 179, 451, 452, 465, 74

(56) References Cited

U.S. PATENT DOCUMENTS 6,140,960 * 10/2000 Kitayoshi .............................. 342/360
6,188,356 * 2/2001 Kitayoshi .............................. 342/451
6,198,539 * 3/2001 Kitayoshi .............................. 356/457

* cited by examiner

Primary Examiner—Don Wong
Assistant Examiner—Hoang Nguyen
(74) Attorney, Agent, or Firm—Gallagher & Lathrop; David N. Lathrop

(57) ABSTRACT

Antenna elements A1 to A24 of a ring-shaped array antenna are selectively connected to power combiners each with a switch SH1, SH2 and SH3 one after another. When a direct wave and a reflected wave arrive in the directions of the antenna elements A5 and A3, respectively, the antenna elements A2, A5 and A8 in the power combiner SH2 are selected and their received signals are input into a receiver Rr to obtain therefrom an output Sr(2+5+6, f), and the respective antenna elements of the power combiners SH1 and SH3 are sequentially selected and their received signals are input into a receiver Rm to obtain therefrom outputs Sm(1, f), Sm(3, f), . . . . The outputs from the receivers Rr and Rm are caused to interfere with each other in an interferer 11 to detect an interference output to obtain data E(K, L). The antenna elements A3, A4, A6 and A7 are selected and their received signals are applied to the receiver Rr, and the antenna elements of the power combiner SH2 are sequentially selected and their received signals are applied to the receiver Rm, by which data E(K, L) is similarly obtained. For the thus obtained data E(K, L) an evaluation function is calculated for hologram reconstruction.

12 Claims, 13 Drawing Sheets

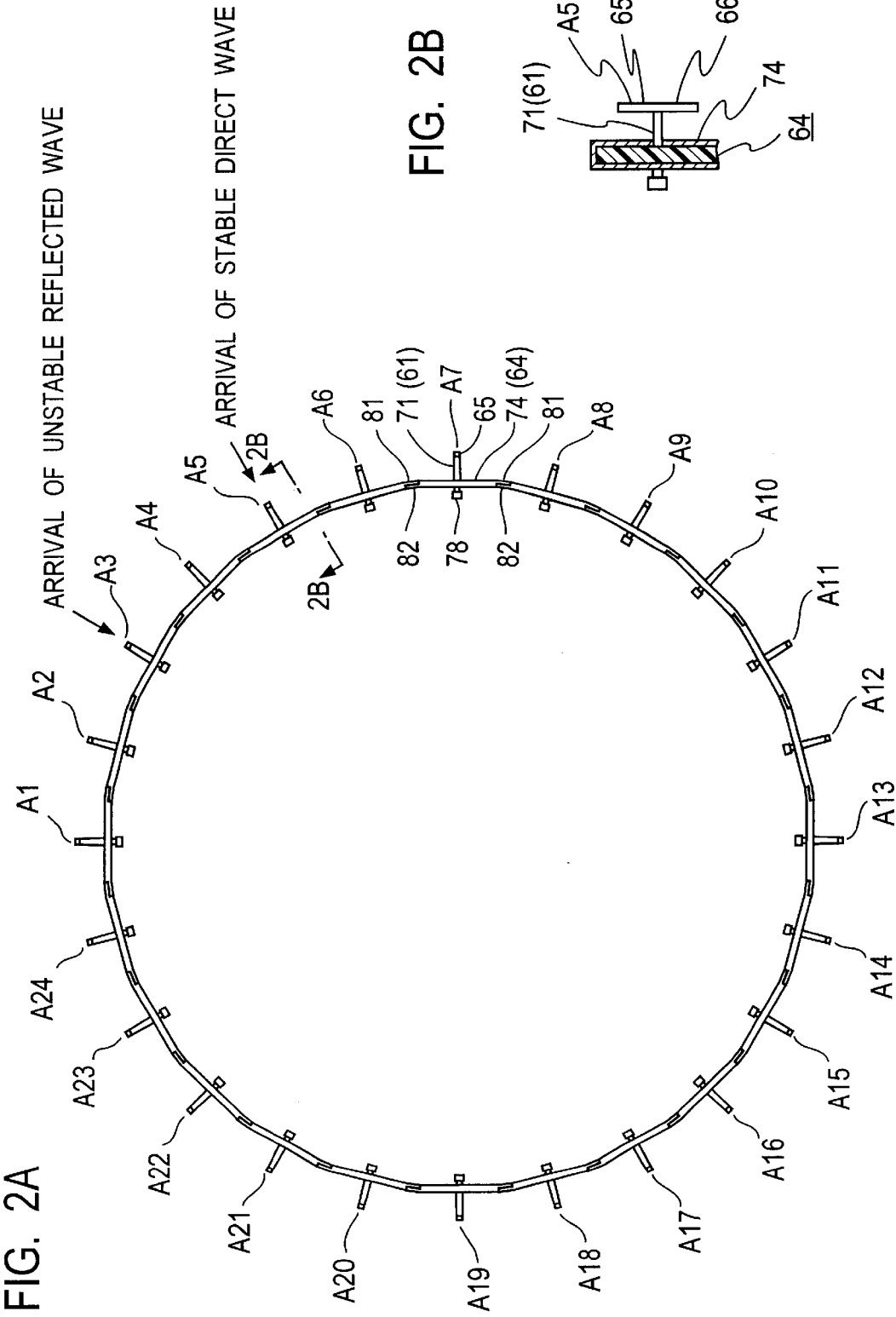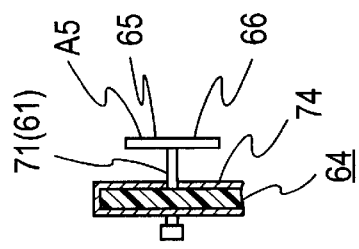

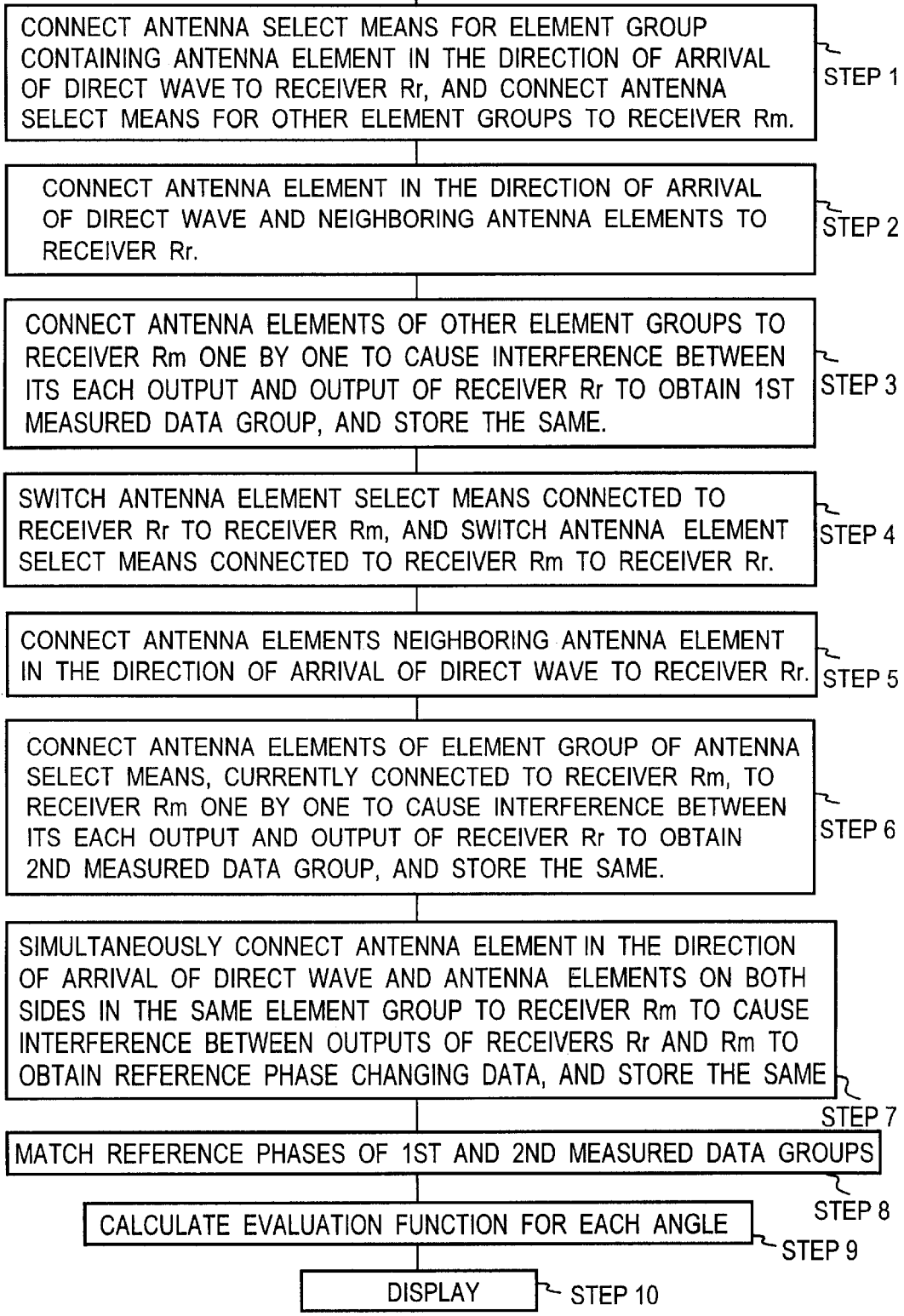

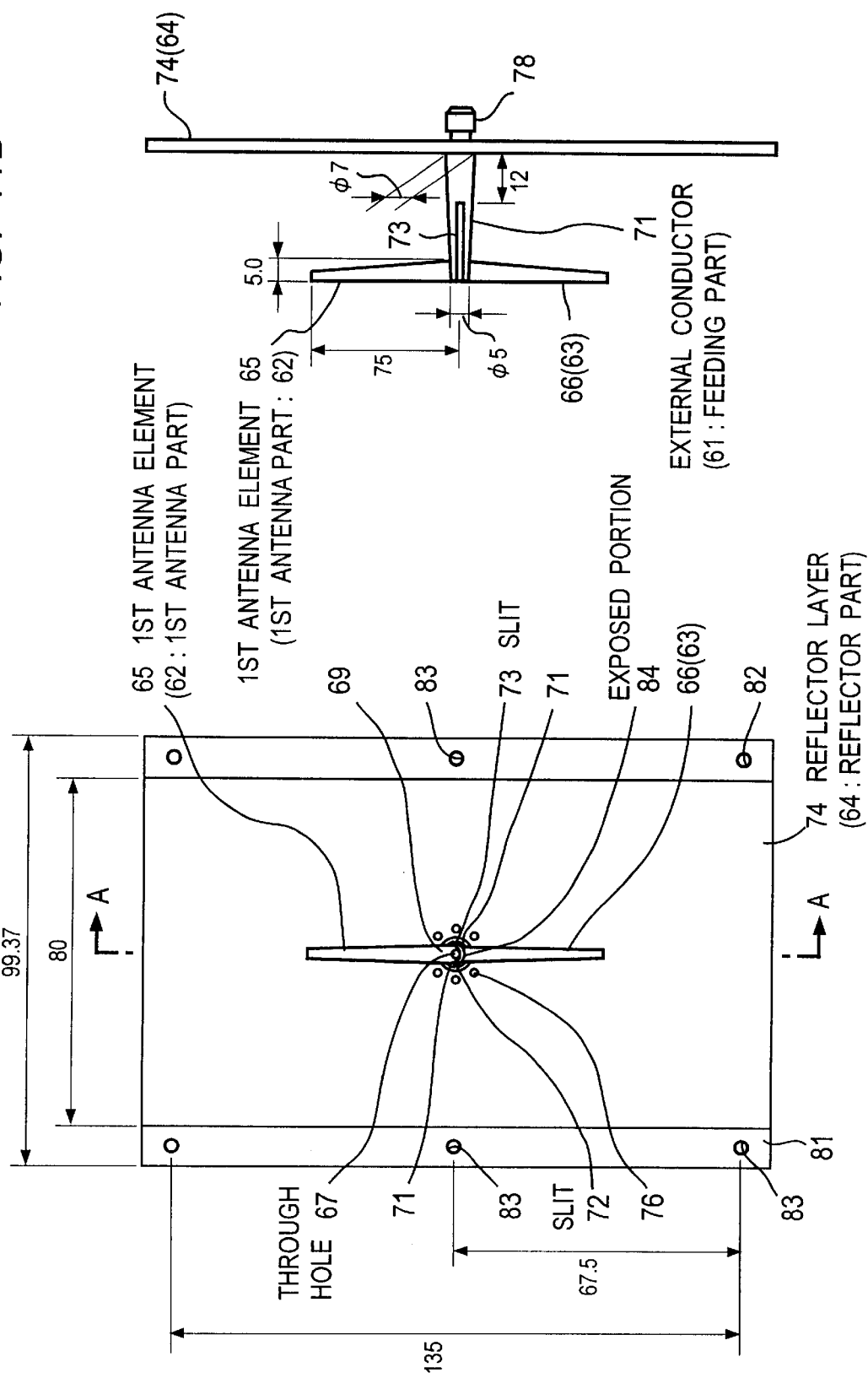

RADIO HOLOGRAM OBSERVATION APPARATUS AND METHOD THEREFOR

BACKGROUND OF THE INVENTION

The present invention relates to an apparatus and method for observing a radio hologram by a two-input interference observation method.

The inventor of this application has proposed an apparatus and method for observing a radio hologram in Japanese Patent Application Laid-Open Gazette No. 11-65405 entitled "Circumference Scanning Type Hologram Observation Apparatus and Method Therefor" (laid open Mar. 5, 1999, corresponding German Patent Application Laid-Open DE19838052A-1). As depicted in FIG. 1, a fixed antenna Ar and a rotary scanning antenna Am which is driven by a motor M are used, and the received signal from the antenna Am is received by a receiver Rm via a rotary joint $J_R$, whereas the received signal from the fixed antenna Ar is received by a receiver Rr. The receivers Rm and Ar select and amplify signals of a preset frequency f, and output IF signals Sr(f) and Sm($\phi$, f) (where $\phi$ is azimuth). These output signals Sr(f) and Sm($\phi$, f) are applied to interference means 11, wherein they are caused to interfere with each other to obtain $\int Sr^*(f) \cdot Sm(\phi, f)$ (where * indicates a complex conjugate), which is detected by a complex detector 12 to obtain measured data E($\phi$). This data is stored in a buffer memory 21 for the rotational angle (horizontal azimuth) of the rotary scanning antenna Am. For the stored result a calculation/display part 22 performs a computation to reconstruct a hologram and displays the result of computation.

By carrying out the hologram measurement as described above, it is possible to obtain a viewing angle over the entire range of 360 degrees with no blind spots.

Because of mechanical driving of the antenna Am for rotary scanning, the above apparatus is incapable of making fast hologram observations. Another disadvantage is susceptibility to unstable reflected and/or diffracted waves.

It is therefore an object of the present invention to provide a radio hologram observation apparatus and method that permit fast hologram observation.

Another object of the present invention is to provide a radio hologram observation apparatus and method that permit stable measurements unaffected by fading.

Still another object of the present invention is to provide a dipole antenna which is simple-structured and suitable for mass production and a manufacturing method which permits easy fabrication of dipole antennas of uniform characteristics.

SUMMARY OF THE INVENTION

According to an aspect of the present invention, there is provided a hologram observation apparatus which includes a cascade connection of a plurality of antenna select means for selecting at least one of received signals of antenna elements of a ring-shaped array antenna and a plurality of receiver select means for supplying the selected received signal to any one of a plurality of receivers and in which: the received signal from the selected antenna element is provided to a selected one of the receivers; received signals from other selected antenna elements are provided to another one of the receivers; and the outputs from the two receivers are combined as a reference signal for interference with the output from another receiver to conduct hologram observations.

The receiver for providing the reference signal output receives, as a synthetic directional pattern, a combined version of received signals from a plurality of antenna elements. The antenna elements are selected so that the main lobe of the synthetic directional pattern is set in the direction of arrival of a radio wave and the null in the direction of arrival of a reflected and/or diffracted wave.

The selective supply of the antenna element received signal to the receiver which provides the reference signal output is fixed, and the observation is made of the interference between received signals while sequentially switching the selective application of antenna element received signal to the other receiver.

According to another aspect of the present invention, there is provided a dipole antenna which comprises: a tubular feeding part and first and second antenna parts formed in one piece of an insulating material, the first and second antenna parts being extended from one end of the feeding part in opposite directions and having a length nearly equal to ¼ of the effective wavelength $\lambda$; a first antenna element formed by a metal-plated layer all over the first antenna part and extending to the edge of a through hole of the feeding part; a second antenna element formed by a metal-plated layer all over the second antenna part; a through hole formed by a metal-plated layer deposited all over the interior surface of the through hole and connected to the first antenna element; an outer conductor formed by a metal-plated layer deposited all over the outer peripheral surface of the feeding part and connected to the first and second antenna elements; a pair of slits cut in the outer conductor lengthwise thereof between the first and second antenna elements, the pair of slits extending a length about $\lambda/4$ from one end of the feeding part; and a connector part formed at the other end portion of the feeding part.

According to another aspect of the present invention, a reflector part is formed integrally with the feeding part and the first and second antenna parts such that it is spaced about $\lambda/4$ apart from said first and second antenna parts of the feeding part, contiguous to or away from said pair of slits and substantially vertical to the feeding part and that the feeding part lies at the center of the reflector part, and a reflector layer is formed by a metal-plated layer over the entire surface area of either side of the reflector part and connected to the outer conductor.

According to the antenna manufacturing method of the present invention, the above-mentioned antenna portion made of an insulating material is molded in one piece, then the entire area of the mold surface is given metal plating, and the plating is partly removed to form a balun of the external conductor with first and second antenna elements and a $\lambda/4$ long slit.

BRIEF DESCRIPTION OF THE DRAWINGS

FIG. 2A is a plan view showing an example of an array antenna for use in the apparatus of the present invention;

FIG. 2B is a sectional view taken along the line 2B—2B in FIG. 2A;

FIG. 6 is a flowchart showing the procedure of this invention method;

FIG. 11A is a front view illustrating an embodiment of the dipole antenna according to the present invention;

FIG. 11B is its right side view;

DETAILED DESCRIPTION OF THE PREFERRED EMBODIMENTS

Figure 1:
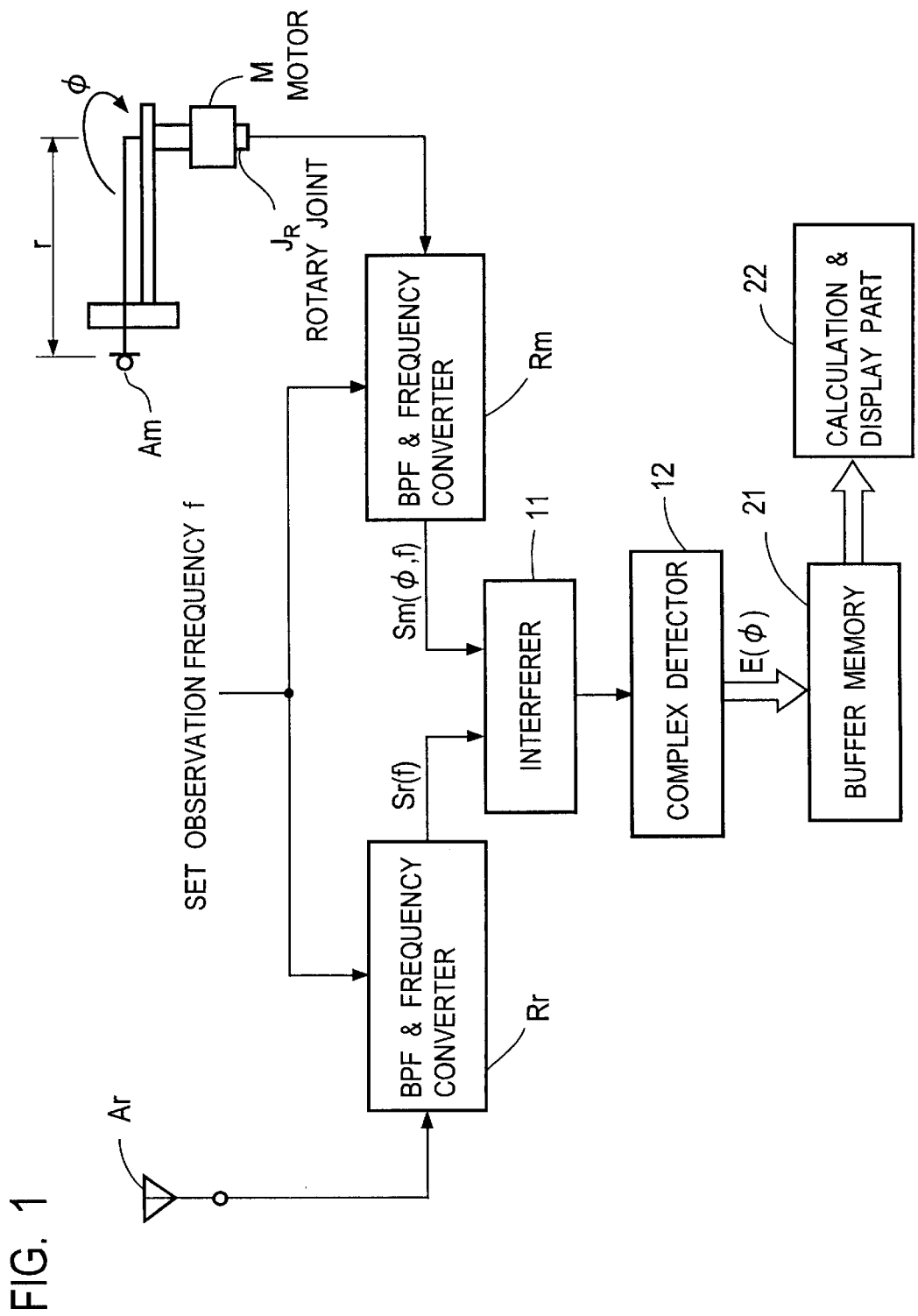
FIG. 1 is a block diagram depicting a conventional radio wave hologram observation apparatus.

The present invention employs an array antenna, whose antenna elements are divided into two or more groups, and each group is selected by antenna select means. For example, as depicted in FIG. 2, antenna elements A1 to A24 are disposed at equiangular intervals to form a ring in a horizontal plane. The antenna elements A1 to A24 are half-wave dipole antennas, which are extended vertically (normal to the plane of paper). The reference numerals in FIG. 2 will be described later on.

Figure 3:
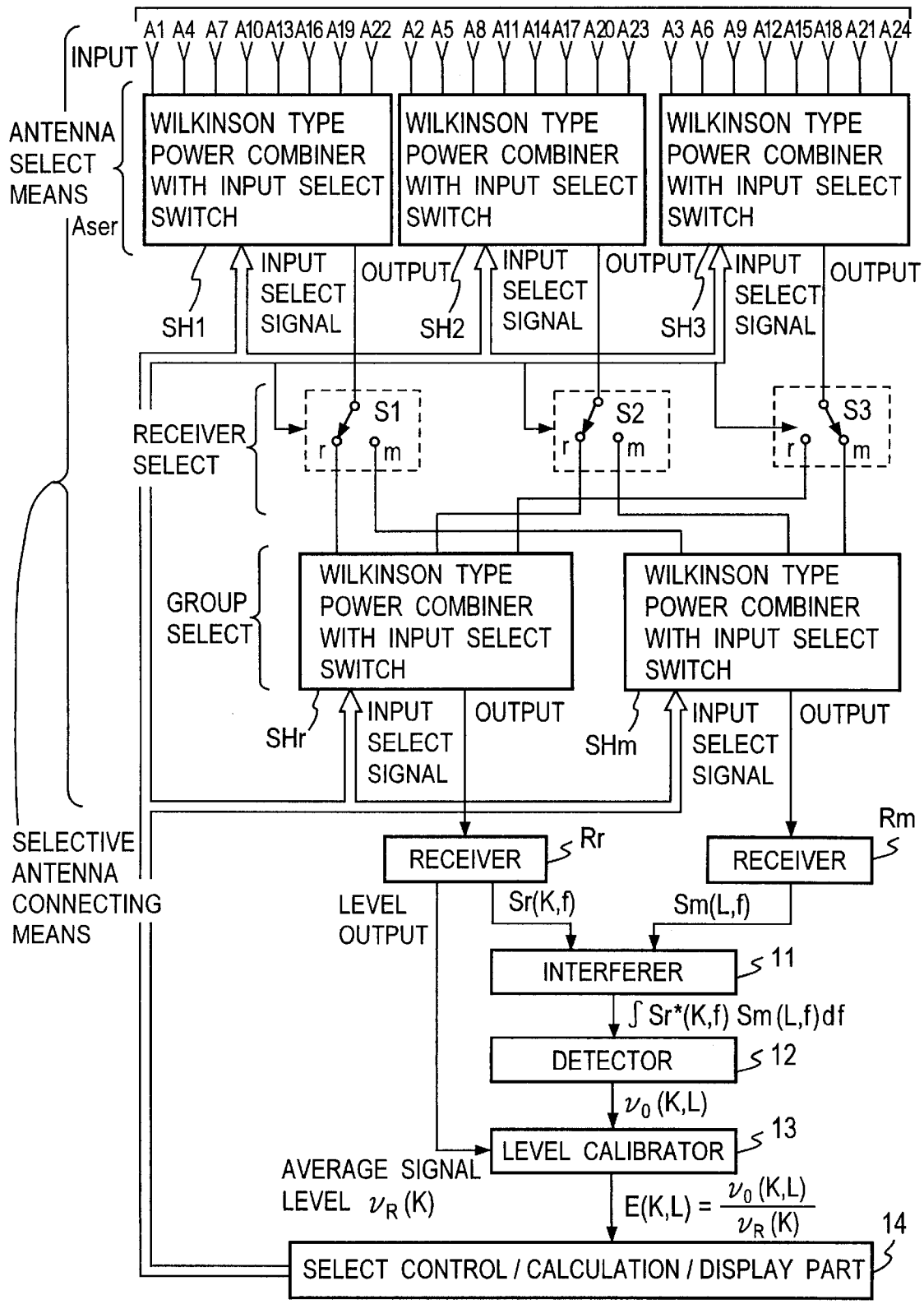
FIG. 3 is a block diagram depicting an example of the functional configuration of this invention apparatus.
Figure 4:
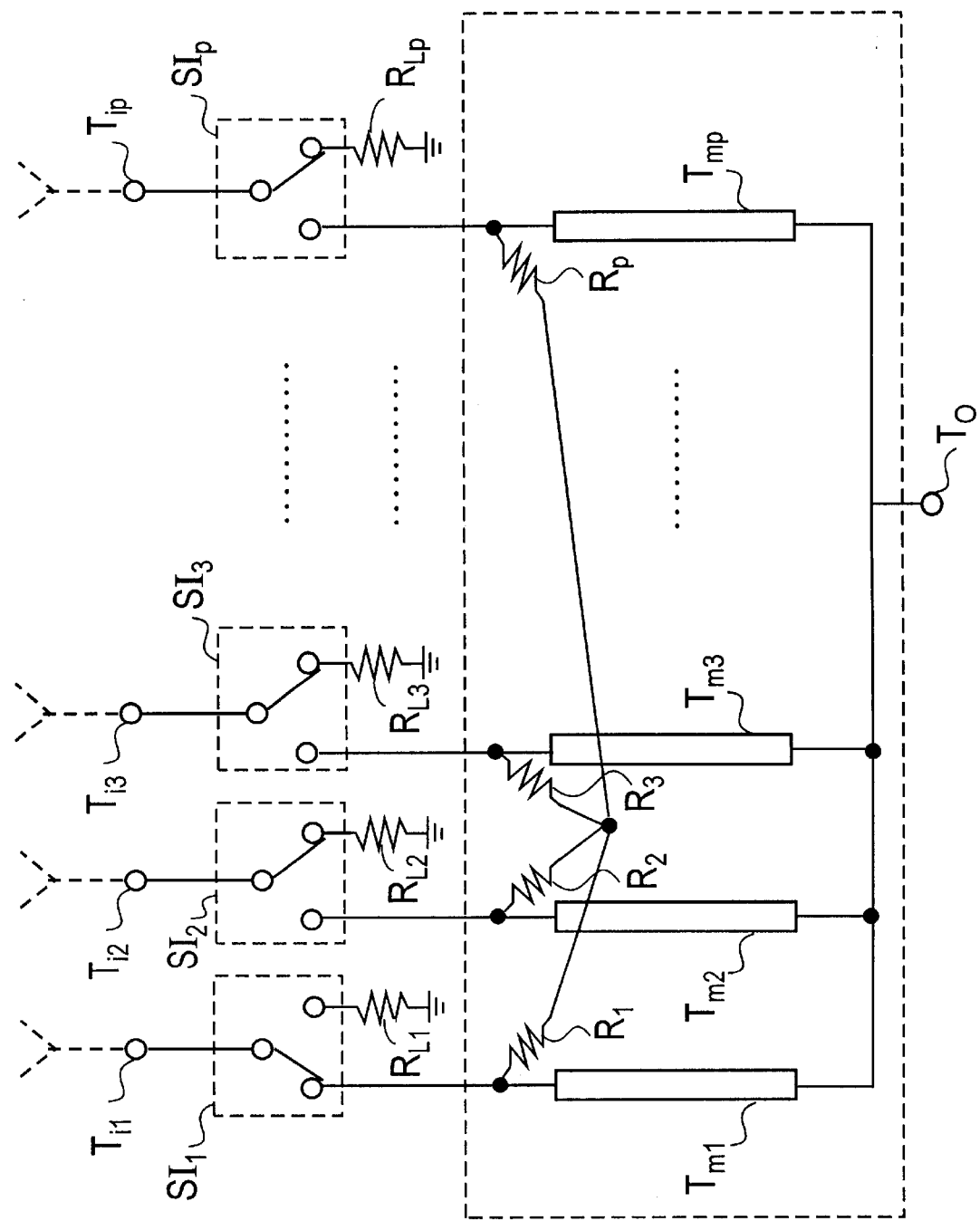
FIG. 4 is an equivalent circuit diagram of a Wilkinson type power combiner with an input select switch in FIG. 3.

Shown in FIG. 3 is an example in which the antenna elements A1 to A24 are divided into three groups by connecting every fourth antenna elements to one of three Wilkinson type power combiners SH1 to SH3. The Wilkinson type power combiners SH1 to SH3 are each controlled by an input select signal to combine the power of an arbitrary number of input signals. The Wilkinson type power combiner with an input select switch has such a construction as shown in FIG. 4, in which input terminals $T_{i1}, T_{i2}, \ldots, T_{ip}$ to be connected to antenna elements are selectively connected by switches $SI_1, SI_2, \ldots, SI_p$ to $\lambda/4$ transformers $T_{m1}, T_{m2}, \ldots, T_{mp}$ at one end thereof or terminating resistances $R_{L1}, R_{L2}, \ldots, R_{Lp}$, the $\lambda/4$ transformers each having a characteristic impedance. The $\lambda/4$ transformers $T_{m1}, T_{m2}, \ldots, T_{mp}$ are connected at the other end to an output terminal $T_o$ and are interconnected at the input end via resistors $R_1, R_2, \ldots, R_p$. With selective control of the switches $SI_1, SI_2, \ldots, SI_p$ by external control signals, one or more input terminals can be connected to the output terminal $T_o$ as desired.

What is required here is to select one or more of a plurality of input terminals, combine the power of input signals applied thereto and provide the combined power to one output terminal; hence, the above-mentioned Wilkinson type power combiners need not always be employed. The outputs from the Wilkinson type power combiners SH1 to SH3 are provided via switches S1 to S3 to either one of two Wilkinson type power combiners SHr and SHm. The outputs from the two power combiners SHr and SHm are applied to fixed-reception receiver (hereinafter referred to also as a fixed receiver) Rr and a scanning-reception receiver (hereinafter referred to also as a scanning receiver) Rm, respectively.

The power combiners SH1 to SH3 constitute antenna select means Aser for selecting antenna elements; the switches S1 to S3 constitute receiver select means for selecting either one of the receivers Rs and Rm; and the power combiners SHr and SHm constitute group select means for selecting the groups of antenna elements. The antenna select means, the receiver select means and the group select means are used to observe the interference between received signals by the antenna elements of the respective groups.

That is, the receivers Rr and Rm select and frequency convert received signals based on arbitrary center frequencies and arbitrary frequency bands, and output IF signals. At the same time the average level (amplitude) of the output IF signals is detected. These receivers Rr and Rm can be implemented by operating, for example, a spectrum analyzer in a zero span mode (in a frequency sweep stop mode). The output IF signals are applied to the interferer 11. The interferer 11 outputs as a line spectrum of a fixed frequency the result of frequency integration of cross spectra of the two input signals. The interferer 11 is disclosed in detail, for instance, in Japanese Patent Application Laid-Open Gazette No. 9-133721 entitled "Correlation Function Measuring Method and Apparatus" (Laid open on May 20, 1997). Letting the numbers of the antenna elements from which the received signals are applied to the receivers Rr and Rm be represented by K and L, respectively, and letting the receive frequency be represented by f and the output IF signals from the receivers Rr and Rm by Sr(K, f) and Sm(L, f), respectively, the output from the interferer 11 is $\int Sr^*(K, f).Sm(L, f)df$, where "*" represents a complex conjugate.

The detector 12 detects the amplitude and phase of the output line spectrum from the interferer 11. The detected complex amplitude $v_0(K, L)$ normalized by a level calibrator 13 with the detected average signal level $v_R(K)$ from the receiver Rr to obtain measured data $E(K, L)=v_0(K, L)/v_R(K)$. The measured data E(K, L) is a complex number. In this way, an interference signal between received signals by the selected antenna elements of the two groups is produced. The thus obtained interference signal (the measured data E(K, L) is used to calculate an evaluation function $V(\phi')$ in a select control/calculation/display part 14 and the calculated result is displayed therein.

Figure 5:
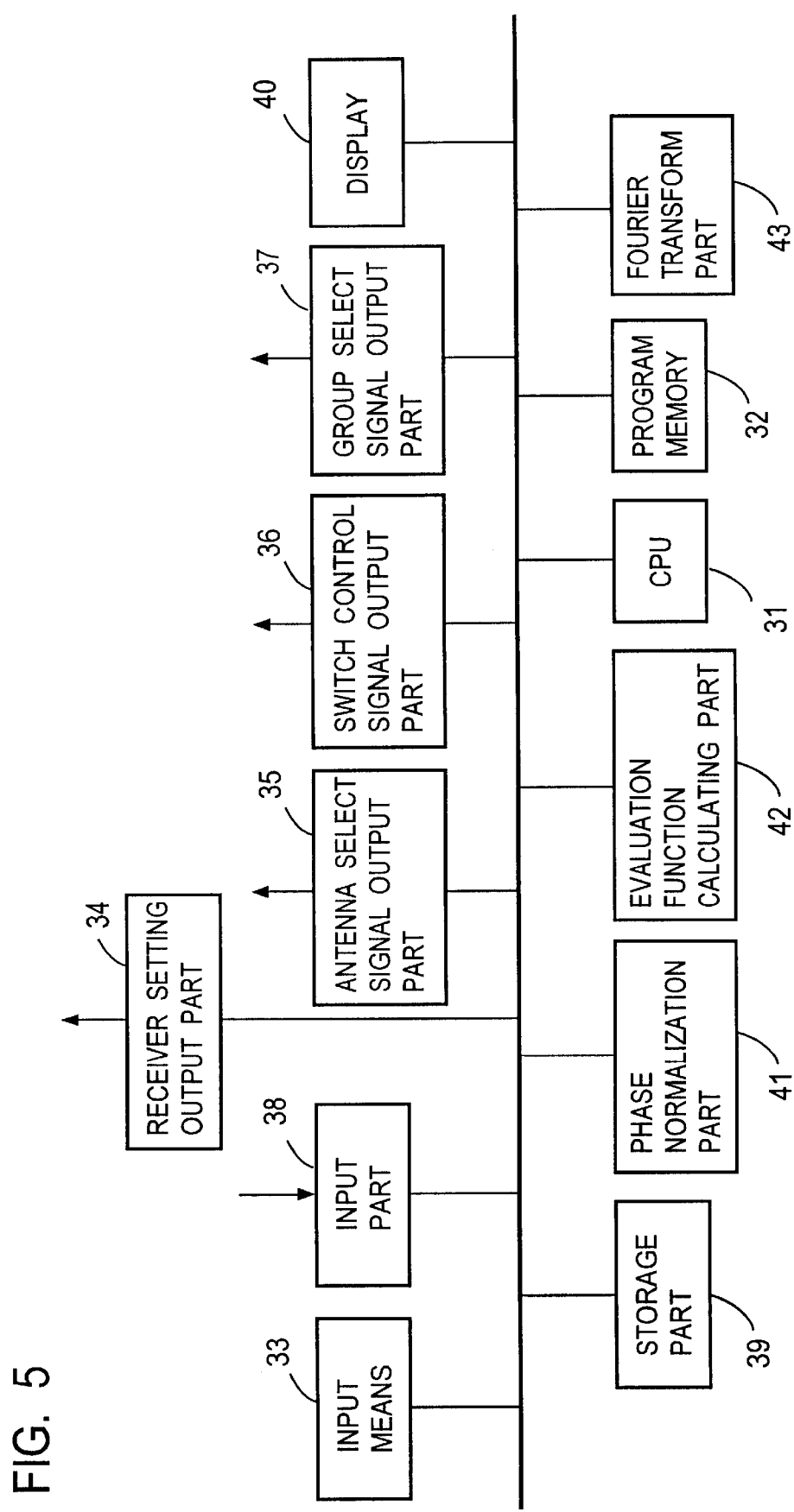
FIG. 5 is a block diagram depicting an example of the functional configuration of a select control/calculation/display part 14 in FIG. 3.

The select control/calculation/display part 14 effects various kinds of control; for example, as depicted in FIG. 5, a CPU (Central Processing Unit) 31 reads out programs from a program memory 32 and interprets and executes instructions in the programs. Upon setting the receive frequency and the receive frequency bandwidth in input means 33, the CPU 31 sets the receive frequency f and the receive bandwidth of each of the receivers Rr and Rm via a receiver setting output part 34. The CPU 31 supplies an antenna select signal to each of the Wilkinson type power combiners SH1 to SH3 via an antenna select signal output part 35, enabling an arbitrary antenna element to be connected to the switch connected to the power combiner. The CPU 31 provides a switch control signal via a switch control signal output part 36 to each of the switches S1 to S3 to change over its connection. Furthermore, the CPU 31 applies a group select signal via a group select signal output part 37 to each of the Wilkinson type power combiners SHr and SHm to selectively output an arbitrary one of signals input thereinto.

The measured data E(K, L) from the level calibrator 13 is input via an input part 38 into the select control/calculation/ display part 14 and stored in its storage part 39. The select control/calculation/display part 14 further comprises a phase normalization part 41 for phase standardization of measured data, an evaluation function calculating part 42 for calculating the evaluation function V($\phi$'), and a display 40 for displaying the calculated evaluation function.

Next, a description will be given, with reference to FIG. 6, of the procedure for interference observation through the use of the apparatus described above. The procedure begins with determining the direction of arrival of a direct wave in step 0. This will be described later on.

Turning back to FIG. 2, a hologram observation method will be described in connection with the case where a direct wave and an unstable reflected wave (reflected by a moving vehicle or the like and varying with time) are arriving from the directions of the antenna elements A5 and A3, respectively, as viewed from the center of array of antenna elements.

(1) The receiver select switch S1 is connected to the power combiner SHm, that is, to the receiver Rm side, the switch S2 is connected to the power combiner SHr, that is, to the receiver Rr side, and the switch S3 is connected to the power combiner SHm, that is, to the receiver Rm side. In other words, the antenna select means for the antenna element group containing an antenna element in the direction of arrival of the direct wave is connected to the fixed receiver Rr and the antenna select means for the other antenna groups is connected to the scanning receiver Rm.

(2) The power combiner SH2, which serves as antenna select means, selectively connects the antenna elements A2, A5 and A8 to the switch S2 but keeps all the other antenna elements disconnected therefrom. As a result, the receiver Rr provides an output Sr' (2+5+8, f). That is, the antenna element in the direction of arrival of the direct wave and the antenna elements on both sides in the same antenna element group are connected to the receiver Rr.

(3) The power combiners SH1 and SH3, connected to the receiver Rm side, connect the antenna elements to selected one of the switches S1 and S2 one after another. In consequence, the receiver Rm provides output signals Sm' (1, f), Sm'(3, f), Sm'(4, f), . . . , Sm'(24, f) in a sequential order. These output signals are applied to the interferer 11, wherein they are caused to sequentially interfere with the output signal Sr'(2+5+8, f) from the receiver Sr. The level calibrator 13 provides measured data E(2+5+8, 1), E(2+5+8, 3), E(2+5+8, 4), . . . , E(2+5+8, 24) based on or normalized by the output signal Sr'(2+5+8, f). These pieces of measured data are stored in the storage part 39. That is, the antenna elements of the other element groups are sequentially connected to the scanning receiver Rm, and its respective outputs are caused to interfere with the output from the receiver Rr in the interferer 11 to obtain a first sequence of measured data, which is stored in the storage part 39.

(4) The receiver select switch S1 is switched to the power combiner SHr, that is, to the receiver Rr side, the switch S2 is connected to the power combiner SHm, that is, to the receiver Rm side and the switch S3 is connected to the power combiner SHr, that is, to the receiver Rr side. In other words, the antenna element select means connected to the fixed receiver Rr so far is connected to the scanning receiver Rm, and the antenna element select means connected to the receiver Rm so far is connected to the receiver Rr.

(5) The power combiners SH1 and SH3, connected to the receiver Rr side, connect the antenna elements A4 and A7 to the switch S1 and A3 and A6 to the switch S3, and keeps all the other antenna elements out of connection to the switches S1 and S3. As a result, the receiver Rr yields an output signal Sr'(3+4+6+7, f). That is, in the antenna element group connected to the antenna element select means connected to the fixed receiver Rr, the antenna elements on both sides of the antenna element in the direction of arrival of the direct wave are connected to the receiver Rr.

(6) The antenna elements of the power combiner SH2 connected to the receiver Rm side are sequentially connected to the switch S2, by which the receiver Rm provides output signals Sm'(2, f), Sm'(5, f), Sm'(8, f) Sm'(23, f) one after another. These output signals are applied to the interferer 11, wherein they interfere with the output signal Sr'(3+4+6+7, f) from the receiver Rr. As a result, the level calibrator 13 yields measured data E(3+4+6+7, 2), E(3+4+6+7, 5), E(3+4+6+7, 8), . . . , E(3+4+6+7, 23) based on or normalized by the above-said signal Sr'(3+4+6+7, f). These pieces of measured data are stored in the storage part 39. That is, the antenna elements of the element group belonging to the antenna select means connected to the scanning receiver Rm are sequentially connected to the receiver Rm, and its respective outputs are each caused to interfere with the output from the fixed receiver Rr in the interferer 11 to obtain a second sequence of measured, which is stored in the storage part 39.

(7) The power combiner SH2, connected as antenna select means to the receiver Rm, connects the antenna elements A2, A5 and A8 to the switch S2 at the same time, providing from the receiver Rm an output signal Sm'(2+5+8, f). This output signal is caused to interfere with the above-mentioned output signals Sr'(3+4+6+7, f) to obtain a reference signal Sm'(3+4+6+7, f), which is provided to the interferer 11 for interference with the output signal Sm'(2+5+8, f). In consequence, the level calibrator 13 provides reference phase changing data E(3+4+6+7, 2+5+8), which is stored in the storage part 39. That is, the antenna element in the direction of arrival of the direct wave and the antenna elements on both sides in the same antenna element group are simultaneously connected to the receiver Rm, then the outputs from the receivers Rm and Rr at that time are caused to interfere with each other in the interferer 11, and the output from the level calibrator 13 is stored as the reference phase changing data in the storage part 39.

(8) The outputs E(2+5+8, 1), E(2+5+8, 3), . . . , E(2+5+8, 24) provided from the level calibrator 13 in step (3) are all normalized with the output obtained from the level calibrator 13 in step (7); that is, the phase of the output signal Sr'(3+4+6+7, f) is used as the reference phase. More specifically, for example, for the output E(2+5+8, 1), the following calculation is conducted in the phase normalization part 41.

$$E(1)=(E(2+5+8, 1)/E(3+4+6+7, 2+5+8)) \cdot |E(3+4+6+7, 2+5+8$$

For the other outputs, their phases are similarly normalized to obtain E(3), E(4), . . . , E(24).

Since the reference phase for the outputs E(3+4+6;7, 2), E(3+4+6+7, 5), . . . , E(3+4+6+7, 23) provided from the level calibrator 13 in step (6) is Sr'(3+4+6+7, f), the outputs are used intact as E(5), E(8), , E(23) so that, for example, $$E(2)=E(3+4+6+7, 2).$$

In this way, the outputs E(1) to E(24) are all normalized or standardized by the same reference phase and are stored in this order in the storage part 39 so that these pieces of measured data can be read out therefrom with ease. That is, the reference phase changing data is read out of the storage part 39, and at the same time, the respective pieces of data of the first sequence of measured data are sequentially read out, and then processing for normalizing the first sequence of measured data by the reference phase of the second sequence of measured data is performed in the phase normalization part 41 using the reference phase changing data. All the pieces of the measured data thus normalized by in the same reference phase are stored in the storage part 39 in the numerical order of the antenna elements.

(9) The pieces of measured data E(1), E(2), . . . , E(24) are read out of the storage part 39 to perform the reconstruction of holograms, for example, by the following calculation.

$$\phi = n\pi/12, \phi' = n'\pi/12$$

where: n and n'=1, 2, . . . , 24 (where 24 is the number of antenna elements)

$$W(\phi) = (1/\pi)(1 + \cos(2\phi)) \text{ (weighting function)}$$

Letting r represent the radius of the ring-shaped array antenna, $\lambda$ the wavelength of the radio wave to be observed and r' (where r'=r sin $\theta$) an equivalent radius of the array antenna considering the zenith angle $\theta$ of the incoming wave, the direction and amplitude value of the incoming wave can be calculated by $$\text{Evaluation function } V(\phi') = \int_{-\pi/2}^{\pi/2} W(\phi) \exp(-j2\pi r' \cos\phi/\lambda) \cdot E(\phi + \phi') d\phi$$

That is, the calculation of the evaluation function V($\phi$') by integrating $\phi$ from $-\pi/2$ to $\pi/2$ is performed while sequentially changing the value of $\phi$'. And $\phi'=\phi_{max}$ which maximizes the evaluation function V($\phi$') is the direction of arrival of the incoming wave, and V($\phi_{max}$) is its amplitude. For example, when $\phi'=\pi$, $n'=\pi\times(12/\pi)=12$ and ($\phi'=\pi$)+$\pi/2$ and ($\phi'=\pi$)+$\pi/2$ are $\pi/2$ and $3\pi/2$, respectively. Since the values of (n+n') for them are 6 and 18, E(6) to E(18) are used for the calculation of the evaluation function; E(6) is weighted by a value calculated by substituting $\phi=-6\pi/12$ into W($\phi$) exp($-j2\pi r'$ cos $\phi/\lambda$), E(7) is weighted by a value calculated by substituting $\phi=-5\pi/12$ into W($\phi$) exp($-j2\pi r'$ cos $\phi/\lambda$), and E(8) to E(18) are also similarly weighted. The thus weighted E(6) to E(18) are added together to obtain an evaluation function value V($\pi$) for $\phi'=\pi$. That is, V($\pi$) can be obtained by the following calculation.

$$V(\pi) = \sum_{n=-6}^{+6} \left( \frac{1 + \cos(n\pi/6)}{\pi} \exp(-j2\pi r' \cos(n\pi/12)/\lambda) E(n+12) \right)$$

By performing such calculations while setting each $\phi'$(= $\pi/12, 2\pi/12, \ldots, 24\pi/12$), the evaluation function V($\phi$') is obtained.

It is also possible to precalculate W($\phi$)exp($-j2\pi r'$ cos $\phi/\lambda$) for each $\phi$ and prestore it in the storage part 39 so that it may be used to calculate the evaluation function V($\phi$') afterward. The set angle $\phi$' and its evaluation function value V($\phi$') are stored in a storage part in the display 40.

The display 40 displays the evaluation function with the abscissa representing $\phi$' and the ordinate V($\phi$').

Figure 7A:
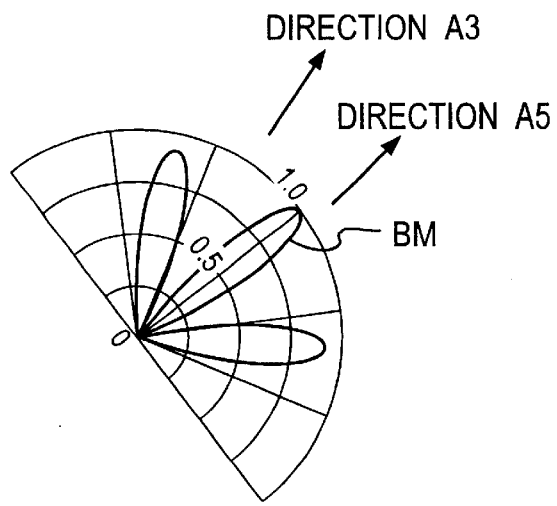
FIG. 7A is a diagram showing an example of a synthetic directional pattern by antenna elements A2, A5 and A8.
Figure 7B:
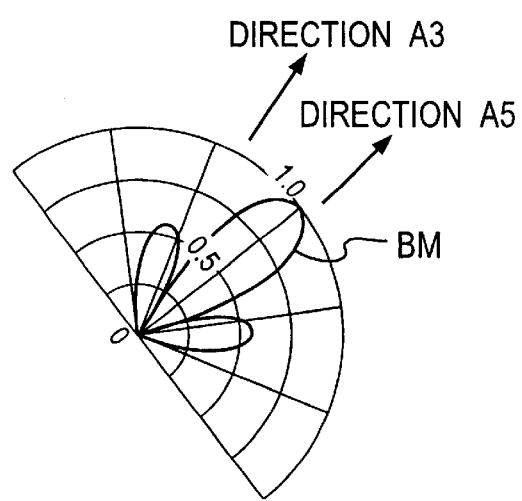
FIG. 7B is a gram showing an example of a synthetic directional pattern by antenna elements A3, A4, A6 and A7.

In the reception by the receiver Rr in steps (2) and (5), temporal variations (i.e. phase fluctuations by multi-path reflection ) of the phase comparison reference signal Sr(K, f) is suppressed by synthesizing the directional patterns of the antenna elements A2, A and A8 and the directional patterns of the antenna elements A3 A4, A6 and A7 such that the main lobes of the synthetic directional patterns are set in the direction of arrival of the direct wave and the nulls in the direction of arrival of the reflected wave. FIG. 7A shows the synthetic directional pattern of the antenna elements A2, A5 and A8, and FIG. 7B the synthetic directional pattern of the antenna elements A3, A4, A6 and A7. In either case, the direction of the main lobe BM is in the direction of arrival of the direct wave (i.e. the direction of the antenna element A5 as viewed from the center O of the circle of array of the antenna elements), and the null is in the direction of arrival of the reflected wave (the direction of the antenna element A3 as viewed from the center O of the circle).

Steps (7) and (8) are to detect the phase difference between phase comparison reference signals measured with the above-mentioned two synthetic directional patterns, calculate one of the phase comparison reference signals and obtain the measured results of hologram observation based on the same phase reference.

By performing steps (1) to (9) repeatedly while scanning in the direction of the main lobe of the synthetic directional pattern for obtaining the phase comparison reference signal, hologram images of radio waves in plural directions of their arrival are observed, by which it is possible to evaluate an interference and/or disturbing wave and a multi-path reflected wave separately of each other. That is, steps (1) to (9) are performed, for example, after the direction of the main lobe held in the direction of the antenna element A5 by simultaneous selection of the antenna elements A2–A5-A8 and A3-A4-A6-A7, is switched to the direction of the antenna element A6 by simultaneous selection of A3-A6-A9 and A4-A5-A7-A8. Thereafter, steps (1) to (9) are similarly repeated while switching the direction of the main lobe of the synthetic directional pattern from one antenna element to another. A plurality of hologram images thus obtained are observed, and radio waves of varying relative levels are decided as interference and/or disturbing waves and radio waves with no variations in their relative levels are decided as a multi-path reflected waves.

Next, a description will be given of how to detect the directions of arrival of a stable direct wave and an unstable reflected wave in step 0 in FIG. 6.

One possible method is to find out a combination of antenna elements receiving radio waves whose levels are close to the maximum receiving level and temporally stable, by connecting all the receiver select switches S1, S2 and S3 to the receiver Rr side and arbitrarily combining the antenna elements through manipulation of the antenna element select means Aser. That is, antenna elements $A_n$, $A_{n+1}$, and $A_{n+2}$ (where n=1) are simultaneously connected to the receiver Rr, and the average signal level $v_R$ ($A_n + A_{n+1} + A_{n+2}$) from the receiver Rr at that time is calculated. If the calculated value is not larger than the maximum value $v_{RMAX}$ of the average signal level obtained so far, then n is incremented by one, that is, the antenna elements simultaneously connected to the receiver Rr are shifted one by one, and if the calculated value is greater than the maximum value $v_{RMAX}$, the latter is updated with the former and n is incremented by one. Then, the simultaneous connection of three antenna elements to the receiver Rr, the detection of the average received signal level, its comparison with the maximum value $v_{RMAX}$ and the one-by-one shifting of the three simultaneously selected antenna elements are repeated until n reaches the maximum value (24 in the example of FIG. 2). The direction of the antenna element $A_{n+1}$ corresponding to the value n+1 at the time the maximum value $v_{RMAX}$ is obtained after the final processing is decided as the direction of arrival of the direct wave.

Another method is to suitably select the antenna elements for connection to the receiver Rr, make hologram observations and selectively determine the direction of a stable radio wave of large level based on the results of observations. This method involves trials of combinations of antenna elements to be connected to the receiver Rr and the evaluation of temporal variations in receiving levels in plural observations that are carried out under the same condition. In general, the measurable angular range by the directional pattern of one antenna element is approximately 120°. Hence, steps (1) to (9) are performed while changing the direction of the main lobe of the antenna directivity for obtaining the phase comparison reference signal through 120° at one time to make the measurement over the entire range of 360°, and steps (1) to (9) are performed at least three times every 120° to evaluate temporal variations of received signals. And the direction of arrival of a stable radio wave is determined as the direction of the direct wave.

In this way, the directions of arrival of the direct wave and the unstable reflected wave are detected, and the antenna elements are so selected as to obtain a synthetic directional pattern whose main lobe is directed in the direction of arrival of the direct wave and the null in the direction of the unstable reflected wave. And stable hologram measurements are made possible by performing steps (1) to (9) using the received signal of the selectively combined antenna elements as the phase reference.

The select control/calculation/display part 14 in FIG. 3 controls the antenna selection and receiver selection for performing steps (1) to (9), the antenna selection and receiver selection for determining the directions of arrival of the direct wave and the unstable reflected wave, make the correction in step (9) for the data E(K, L) obtained, conducts the calculation in step (9), and displays the calculated result using the set angle $\phi'$ as a parameter.

Figure 8:
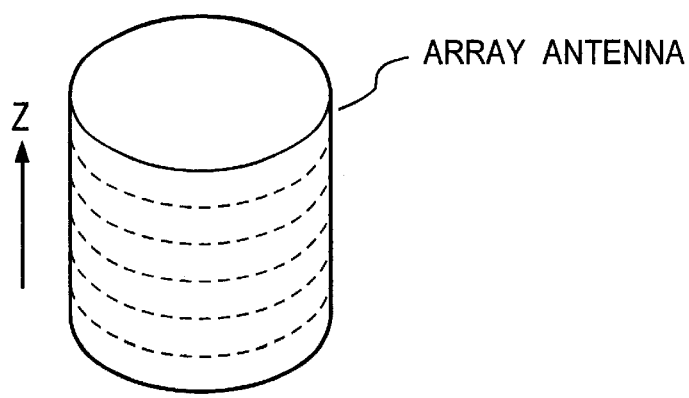
FIG. 8 is a simplified showing of another example of an array antenna.

The array antenna need not always be ring-shaped but it may also be such a circumferentially layered array antenna assembly as depicted in FIG. 8. In this case, steps (1) to (9) are performed for the array antenna of each layer to obtain data E($\phi$, Z) (where Z represents the layer of the array antenna handled, the data E($\phi$, Z) is read out of the storage part 43 and is Fourier transformed in the Fourier transform part 43 for Z. The Fourier-transformed result Γ($\phi$, Ψ) (where Ψ is the elevation angle) is stored in the storage part 39. Then, for each set angle $\phi'$ the transformed results Γ($\phi$, Ψ) corresponding to $-\pi/2$ to $\pi/2$ are read out of the storage part 39, and the following discrete calculation is conducted setting $\theta=\pi/2-\Psi$ to obtain reconstructed hologram images.

$$V(\phi', \theta) = \int_{-\pi/2}^{\pi/2} W(\phi)\exp(-j2\pi r\sin\theta\cos\phi/\lambda)\Gamma(\phi+\phi', \theta)\,d\phi$$

This needs only to make the calculation for one zenith angle $\theta$ for each set angle $\phi'$, hence permitting reduction of computational complexity.

Figure 9:
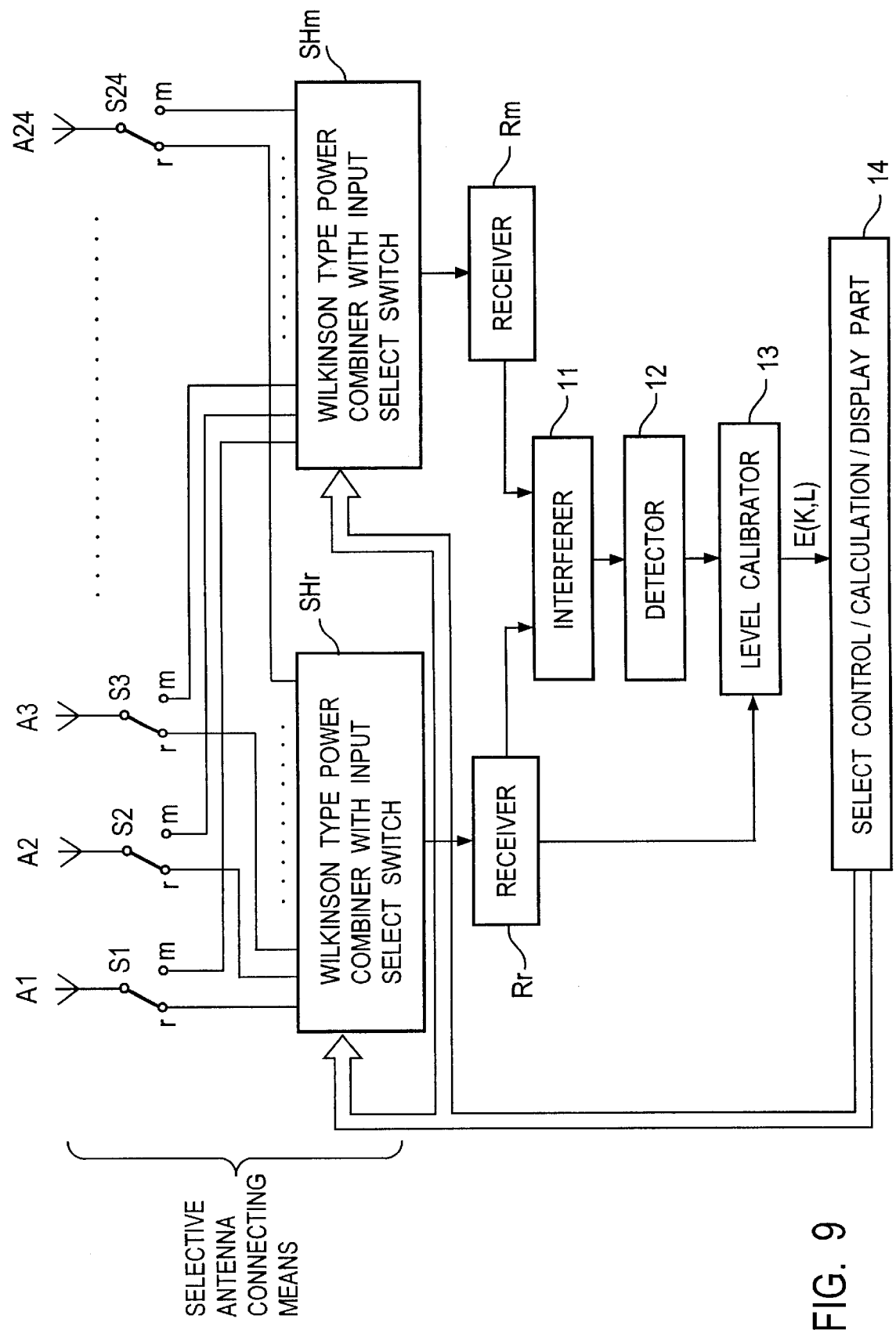
FIG. 9 is a block diagram depicting the functional configuration of another embodiment of the present invention.

In the above, the antenna elements are selected prior to selecting the receiver to which the selected antenna elements are connected, but this order may be reversed. For example, as depicted in FIG. 9, either one of the receivers Rr and Rm is selected for the application thereto of the received signal from each of the antenna elements A1 to A24 through one of receiver select switches S1 to S24, then Rr-side and Rm side change-over contacts r and m of the switches S1 to S24 are connected to the Wilkinson type power combiners SHr and SHm, respectively. The power combiner SHr selects the antenna elements in a manner to provide the reference synthetic directional pattern, and applies their received signals to the receiver Rr. The power combiner SHm selects the antenna elements one after another and applies its received signal to the receiver Rm. The process for the interference between the output from the receiver Rr and the output from the receiver Rm in the interferer 11 and the subsequent processes are the same as described previously with reference to FIG. 3.

The FIG. 3 embodiment has an advantage over the FIG. 9 embodiment that the number of switches used is smaller than in the latter. In FIG. 3 the Wilkinson type power combiners SHr and SHm may be omitted, in which case the switches S1, S2 and S3 are connected at the contact r to the input of the receiver Rr and at the contact m to the input of the receiver Rm. In other words, the group select means can be dispensed with. In this instance, however, there is a fear that a signal input into the receiver Rr, for example, is, reflected to the contact r of the switch S3 disconnected from the receiver Rr and then reflected by the contact r back to the receiver Rr.

In FIG. 3, the number of antenna element groups is not limited specifically to three. In both of FIGS. 3 and 9, the use of three or more receivers and simultaneous processing for the interference between the output from one reference fixed-reception receiver and the outputs from the other scanning-reception receivers could speed up the hologram observation.

According to the radio hologram observation apparatus and method of the present invention, one or more of antenna elements of the array antenna are connected to the fixed-reception receiver, and its output is used as a reference received signal. The other antenna elements are selectively connected to the scanning-reception receiver one after another to provide equivalent rotation of the antenna for the interference between the received signal from each antenna element and the reference received signal. The rotation of the antenna can is faster than in the case of its mechanical driving for rotation, permitting reduction of the time for hologram observations.

Stable measurements can be made by simultaneously selecting two or more antenna elements to set the main lobe of their synthetic directional pattern in direction of the direct wave.

Besides, by setting the null of the synthetic directional pattern in the direction of arrival of the unstable reflected wave or disturbing wave, it is possible to separate such unstable reflected, interference and disturbing waves from the stable direct wave, protecting the hologram observation from their influence.

Figure 10:
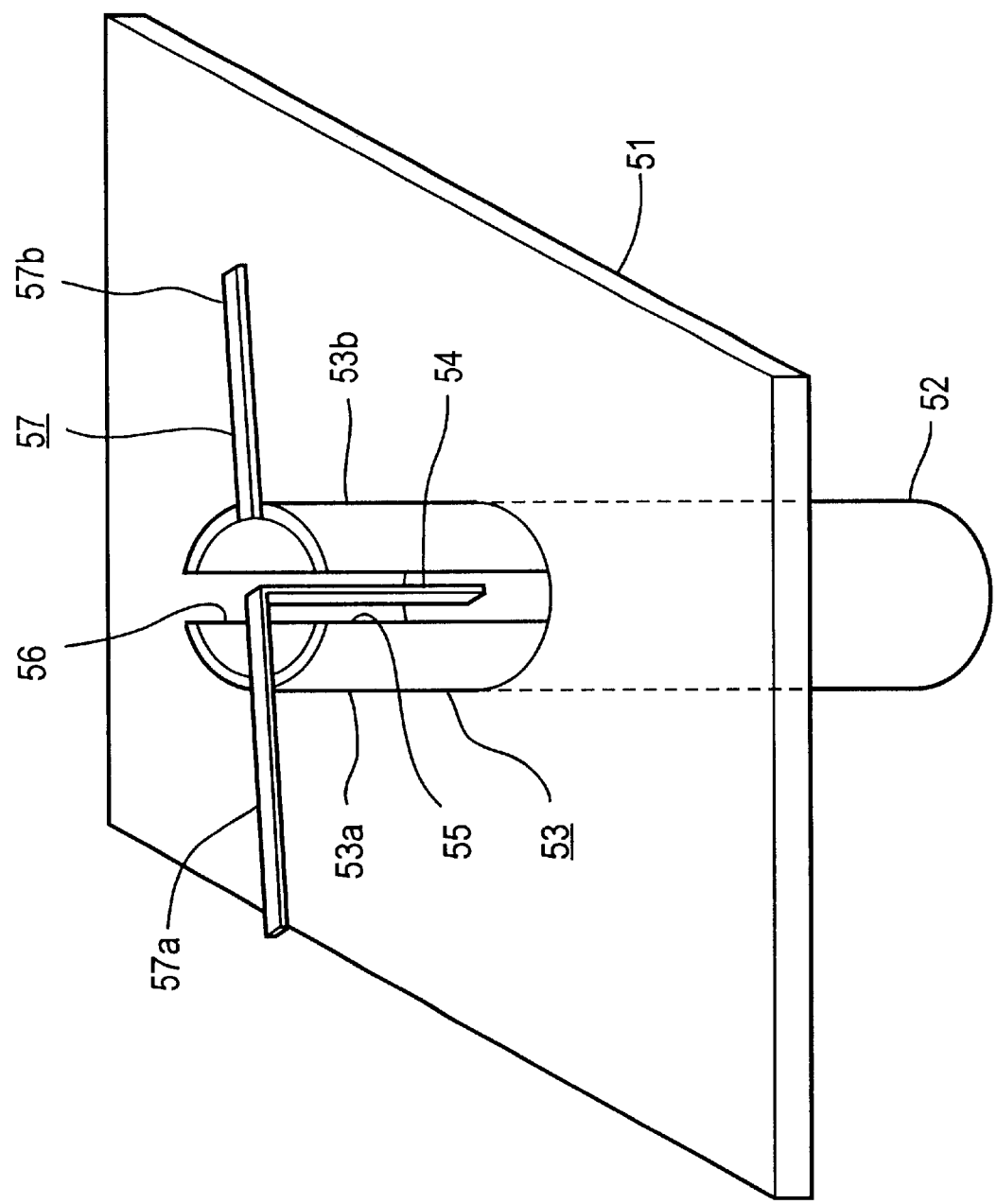
FIG. 10 is a perspective view showing a conventional dipole antenna.

Shown in FIG. 10 is an example of a dipole antenna that can be used as each of the antenna elements A1 to A24. Reference numeral 52 denotes a coaxial cable inserted through a hole made in a metal reflector 51 centrally thereof with its outer and central conductors 53 and 54 placed vertically to the reflector 51. The heights of the outer and central conductors 53 and 54 from the reflector surface are each set about a quarter wavelength. The outer conductor 53 has a pair of diametrically opposed slits 55 and 56 extending down from its top to the reflector 51; namely, the portion of the outer conductor 53 projecting upwardly of the reflector 51 is divided into two outer conductor pieces 53a and 53b. Reference numeral 57a denotes an antenna element connected at one end to the projecting end of the central conductor 54 and connected to the one outer conductor pieces 53a and held in parallel to the reflector 51. Aligned with the antenna element 57a is an antenna element 57b connected at one end to the other outer conductor piece 53b. The length of each of the antenna elements 57a and 57b is approximately $\lambda/4$.

With this structure, the outer conductor 53 with the slits 55 and 56 equal to the $\lambda/4$ length constitutes a balun (i.e., a balanced-to-unbalanced transformer). A balance radiation element of a dipole antenna 57 formed by the antenna elements 57a and 57b and an unbalanced feeder line of the coaxial cable 52 are balanced-to-unbalanced transform-connected, permitting therethrough of the passage of an unbalanced current (a common mode current) to the outside of the coaxial cable 52, thereby preventing unnecessary radiation.

The antenna described above is produced by: making a hole in the reflector 51; inserting the coaxial cable 52 with the slits 55 and 56 through the hole and soldering the outer conductor 53 and the reflector 51; and soldering the antenna element 57a to the central conductor 54 and the outer conductor piece 53a and the antenna element 57b to the outer conductor piece 53b.

Because of such complex manufacturing steps involved in its fabrication, the antenna of this example is not suitable for mass production. Furthermore, the soldering leads to variations in antenna characteristics, and during fabrication it is difficult to compensate for characteristic differences resulting from variations in properties of the materials used. To use this antenna as the array antenna element, it needs additional working for providing required element spacing, inevitably raising the manufacturing costs.

Figure 12A:
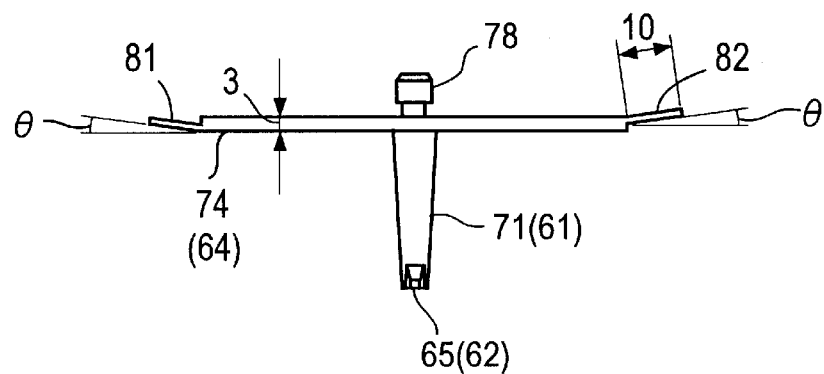
FIG. 12A is its top plan view.
Figure 12B:
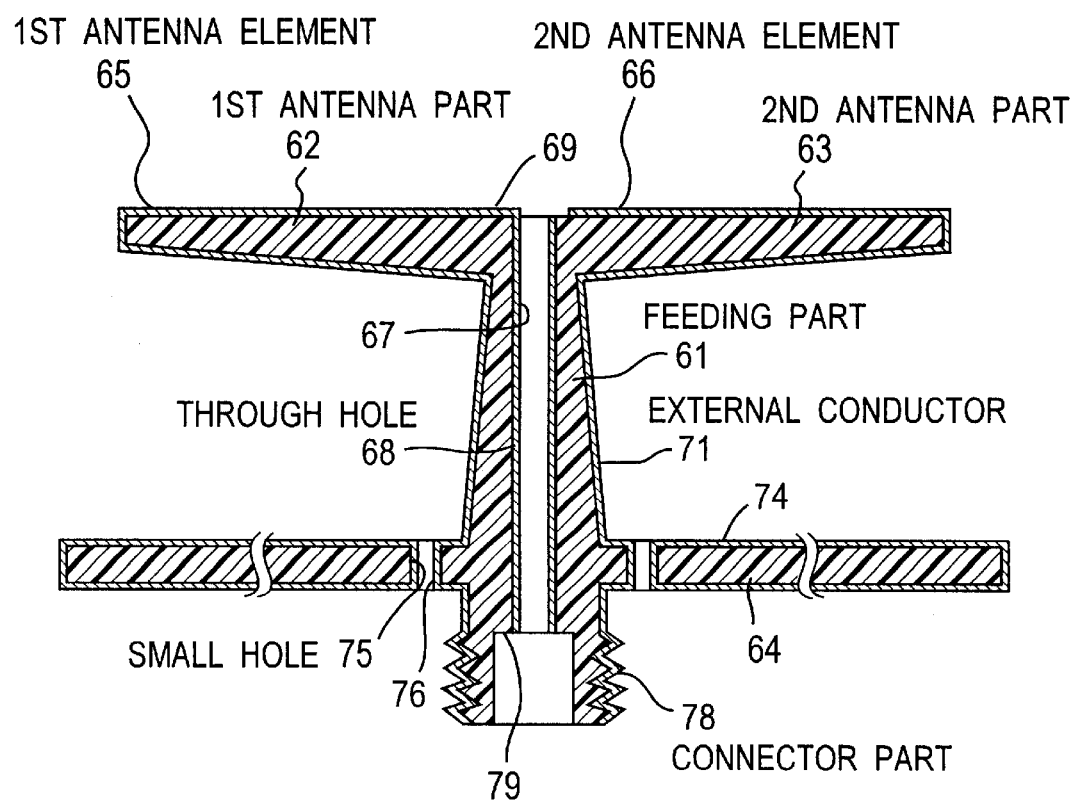
FIG. 12B is a sectional view taken along the line A—A in FIG. 11A.

A description will be given, with reference to FIGS. 11 through 13, of an example of an antenna suitable for use as the antenna element of the apparatus depicted in FIG. 3. As shown in FIG. 12B, a hollow, cylindrical feeding part 61 and first and second antenna parts 62 and 63 are formed in one piece of a synthetic resin material such as LCP (Liquid Crystal Polymer). The first and second antenna parts 62 and 63 each have a length nearly equal to a quarter of the wavelength $\lambda$ used. A reflector part 64, which is approximately $\lambda/4$ away from the first and second antenna parts 62 and 63 and is substantially parallel thereto, is formed integrally with the feeding part 61. The feeding part 61 is located substantially at the center of the reflector part 64. The reflector part 64 may preferably be wide in area; for example, it is provided in a rectangular form measuring, for example, about $\lambda/4$ by $2\lambda$, and is placed with its longer sides held in parallel to the first and second antenna parts 62 and 63 (see FIG. 11).

The first and second antenna parts 62 and 63 are given metal plating to form first and second antenna elements 65 and 66. The tubular feeding part 61 is coated over its interior surface with a metal-plated layer to form a metal-plated through hole 68. At the upper end face of the feeding part 61 the through hole 68 is connected to the first antenna element 65 through a metal-plated coupling part 69.

The feeding part 61 is coated over its exterior surface with a metal-plated layer to form an outer conductor 71, which has a pair of opposed slits 72 and 73 extending from the lower end face of the feeding part 61 toward the reflector part 64. The lengths of the slits 72 and 73 are shorter than the quarter wavelength, i.e. $\lambda/4$.

The reflector part 64 is coated over its external surface with a metal-plated reflector layer 74 and has a plurality of small holes (eight in this example) 75 bored at equiangular intervals about the feeding part 61. The interior surfaces of the small holes 75 are each covered with a metal-plated layer, forming a second through hole 76 that is contiguous to the reflector layer 74.

The end portion of the feeding part 61 on the opposite side from the first and second antenna parts 62 and 63 forms a connector part 78, which is threaded around its outer peripheral surface and is given metal plating. The inner diameter of the connector part 78, defined by a stepped portion 79 formed therein, is larger than the inner diameter of the feeding part 61.

Furthermore, the illustrated antenna is configures so that a plurality of such antennas can be combined into a ring-shaped array antenna. To join the array antenna elements side by side, the antenna of this example has coupling flanges 81 and 82 formed integrally with two opposite longer marginal edges of the reflector part 64 as depicted in FIGS. 11A and 12A. The flanges 81 and 82 are each have a thickness about one-half of that of the reflector part 64. The flange 81 is flush with the one surface of he reflector part 64, whereas the flange 82 is flush with the other surface of the reflector part 64. In this example, the antenna is intended to enable such a ring-shaped array antenna as depicted in FIG. 2 to be formed by joining 24 antennas. The flanges 81 and 82 are formed aslant in opposite directions at an angle $\theta$ nearly equal to 7.5°. The flanges 81 and 82 are also given metal plating, and they have through holes 83 for joining means.

With such a configuration as described above, a coaxial feeder line which has a characteristic impedance of, example, 50 $\Omega$ is formed by the through hole 68 serving as a center conductor and the outer conductor 71; the first and second antenna elements 65 and 66 form a half-wavelength dipole antenna; the reflector layer 74 forms a reflecting surface; and the slits 72 and 73 of the outer conductor 71, which are about $\lambda/4$ long, form a balun (a balanced-to-unbalanced transformer). Thus, a dipole antenna is obtained which suppresses an unbalanced current. Since the through holes 76 formed by the small holes 75 are disposed around the feeding part 61 in close relation thereto, the through holes 76 serve as coaxial outer conductors in the reflector part 64, providing an excellent feeding part.

Figure 13:
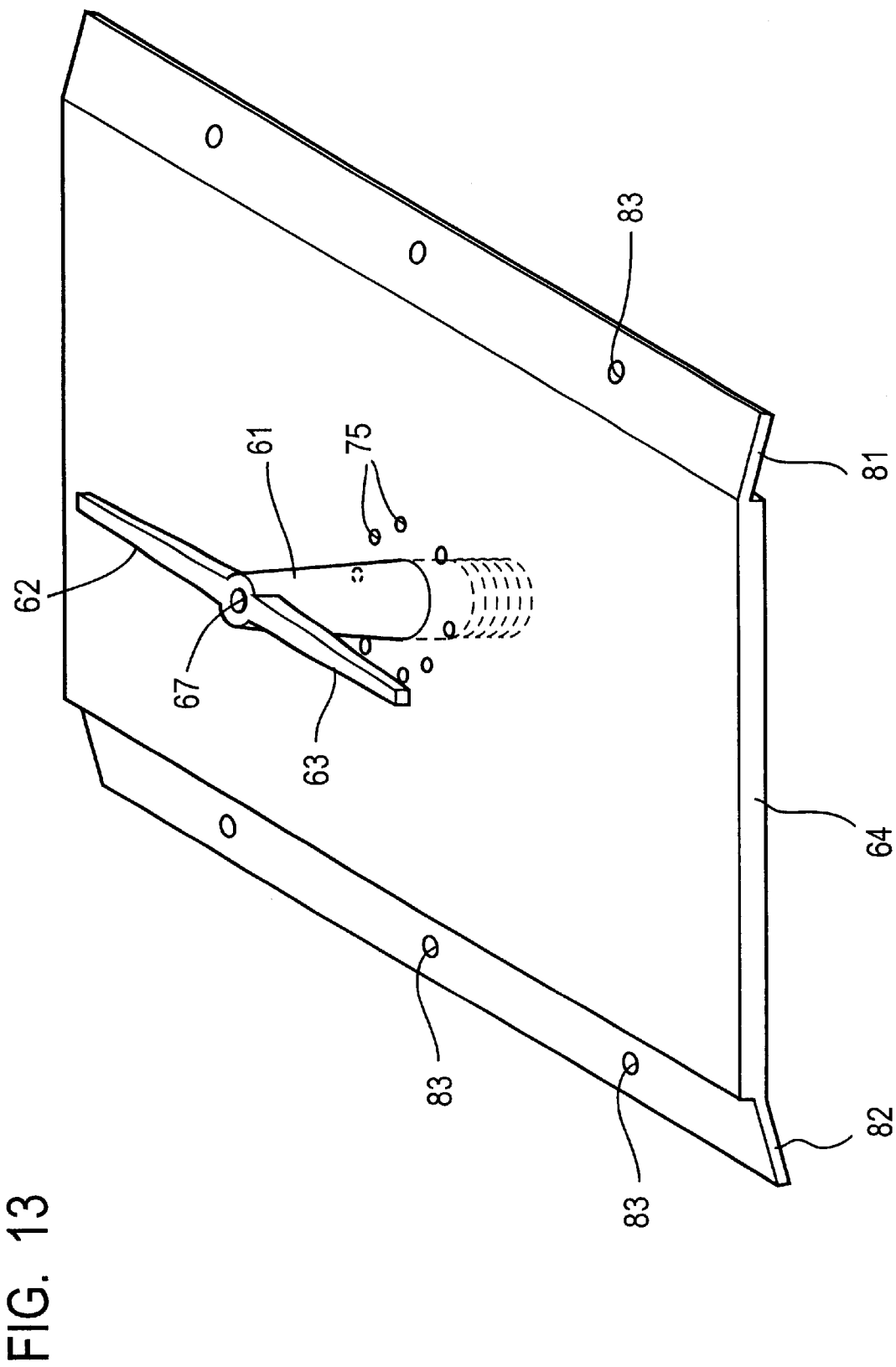
FIG. 13 is a perspective view depicting a molded portion forming a shell of the dipole antenna.

In the manufacture of this antenna, the feeding part 61, as depicted in FIG. 13, a mold is used such that the first and second antenna parts 62 and 63, the reflector part 64, the connector part 78, and the coupling flanges 81–82 are formed in one piece of a synthetic resin material which is excellent in high-frequency characteristic and highly heat-resistant. The synthetic resin material used is, for example, LPC (Liquid Crystal Polymer), which has properties such as $\epsilon_r=4$, tan $\delta=1\%$ or below and heat resistance up to 250°. With the view to facilitate the molten material, the outer diameter of the feeding part 61 near the reflector part 64 is larger than its outer diameter near the first and second antenna elements 62 and 63, and the cross-sectional areas of the first and second antenna elements 62 and 63 are gradually decreased with distance from the feeding part 61. In this instance, the marginal portions of the first and second antenna elements 62 and 63 facing toward the reflector part 64 are tapered and their marginal portions on the opposite side from the reflector part 64 are parallel therewith. During the molding the through hole 67 of the feeding part 61, the small holes 75 and 83 are also made at the same time.

Next, the molded structure is coated all over its surface with a metal-plated layer. The metal-plated layer is provided by depositing, for example, copper (Cu) to a thickness of around 10 $\mu$m, then nickel (Ni) to a thickness of 5 $\mu$m, and gold (Au) to a thickness of 1 $\mu$m or less. The gold coating is intended for corrosion resistance. Such a composition of the metal-plated layer provides a good affinity for the molding of the synthetic resin material.

Following the metal plating, unnecessary portions of the metal-plated layer are removed by an NC milling machine or the like. As depicted in FIG. 11A, the metal-plated layer on the end face of the feeding part 61 adjoining the first and second antenna parts 62 and 63 is selectively removed at the marginal edge diametrically opposite the first antenna part 62 across the through hole 67 to form an exposed part 84, thereby providing the first and second antenna elements 65 and 66. Moreover, the plated layer deposited over the outer peripheral surface of the feeding part 61 is selectively removed to form the slits 72 and 73 which extend from the exposed part 84 of the end face of the feeding part 61 toward the reflector part 64 and are diametrically opposite across the through hole 67.

Figure 14:
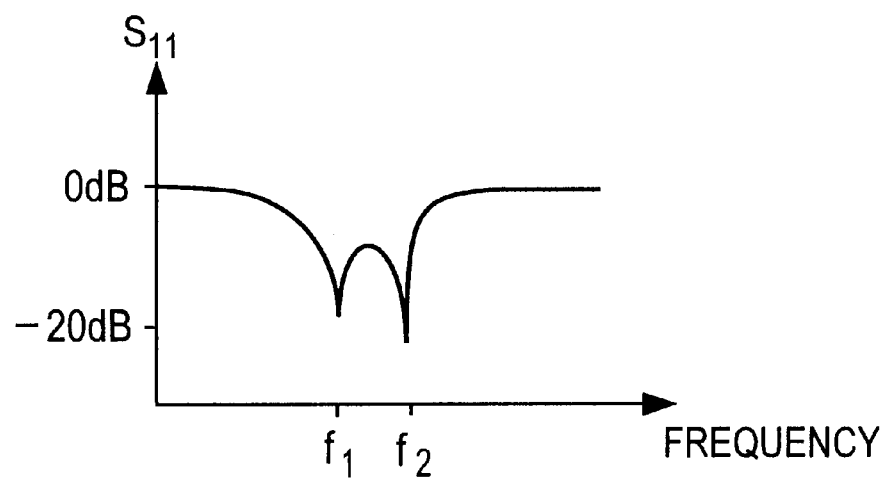
FIG. 14 is a graph showing the frequency characteristic of a parameter $S_{11}$ of the antenna.

In this case, an S parameter $S_{11}$ of this antenna is measured by a network analyzer or the like, and the lengths of the slits 72 and 73 are adjusted so that dip frequencies take desired values. That is, the frequency characteristic of the parameter $S_{11}$ exhibits a dip at a resonance frequency $f_2$ and at a lower frequency $f_1$ as depicted in FIG. 14. The frequency $f_1$ is an impedance matching point of the balun and the dipole antenna by the slits 72 and 73, and varies with the lengths of the slits 72 and 73. The more the frequency $f_1$ is spaced apart from the frequency $f_2$, the wider the bandwidth of the antenna becomes but the higher the voltage standing wave ratio (VSWR). As the lengths of the slits 72 and 73 are made to approach $\lambda/4$, the frequency $f_1$ comes closer to $f_2$. The lengths of the slits 72 and 73 are adjusted such that the frequency $f_1$ is, for example, 80% of the frequency $f_2$, though it varies with the required value VSWR. Taking into account the specific inductive capacity of the material for the feeding part 61, the lengths of the slits 72 and 73 closer to $\lambda 0/(4\sqrt{\epsilon_r})$, the frequency $f_1$ approaches $f_2$. ($\lambda 0$: wavelength in free space)

Figure 15:
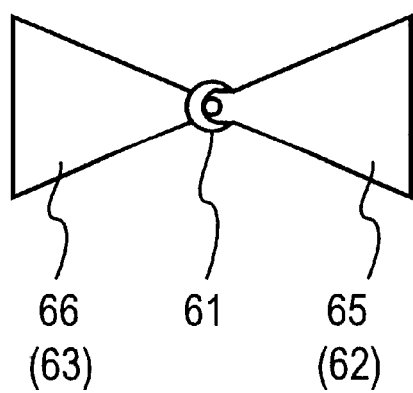
FIG. 15 is a diagram depicting bow-shaped first and second antenna elements 65 and 66.

In FIGS. 11 and 12 there are shown sizes (in mm) of the respective parts of a 2GHz band antenna manufactured using LPC of $\epsilon_r=4$ and tan $\delta=1\%$. In the case of forming a ring-shaped array antenna, the angle $\theta$ of each of the coupling flanges 81 and 82 is increased or decreased, depending on whether the number of antenna elements used is smaller or larger than 24. In the case of a planar array antenna, the angle 0 is zero, that is, the flanges 81 and 82 are parallel to the reflector part 64. The antenna can be made wide-band by making the first and second antenna elements 61 and 62 bow-shaped as depicted in FIG. 15. In the above, the reflector part 64 and the reflector layer 74 may be omitted. The above-described dipole antenna and the array antenna using such dipole antennas can be applied to other apparatus as well as the radio hologram observation apparatus.

As described above, the dipole antenna of the present invention is manufactured by molding the antenna-forming parts in one piece, coating the molding with a metal-plated layer and removing a selected area of the layer—this permits mass production of antenna elements of close dimensional tolerances and hence of desired characteristics. Accordingly, the dipole antenna needs no additional working in the case of forming the array antenna. The dipole antenna of the present invention can be manufactured at low cost.

It is also easy to obtain desired characteristics by adjusting the lengths of the slits 72 and 73 to compensate for variations in the properties of the material used for the feeding part 61.

It will be apparent that many modifications and variations may be effected without departing from the scope of the novel concepts of the present invention.

What is claimed is:

1. A radio hologram observation apparatus comprising:
an array antenna;
a fixed-reception receiver and at least one scanning-reception receiver;
antenna element selectively connecting means for selecting at least one of antenna elements of said array antenna and connecting said at least one antenna element to said fixed-reception receiver, and for selecting at least one of the other antenna elements and connecting said at least one antenna element to said scanning-reception receiver;
data acquiring means for causing the output from said fixed-reception receiver and the output from said scanning-reception receiver to interfere with each other to obtain interference observation data; and
control means for obtaining said interference observation data from said data acquiring means by sequentially switching antenna elements for connection two said scanning-reception receiver while keeping connection of said at least one antenna element to said fixed-reception receiver.

2. The apparatus of claim 1, wherein said control means is means for switching said at least one antenna element connected to said fixed-reception receiver to another antenna element and obtaining second interference observation data while switching said at least one antenna element for connection to said scanning-reception receiver one after another, for calibrating said second interference observation data and said interference observation data on the basis of a common phase reference.

3. The apparatus of claim 1, wherein: said antenna elements of said array antenna are divided into a plurality of groups; and said antenna element selectively connecting means comprises a plurality of antenna select means each of which has connected thereto said antenna elements of one of said plurality of groups, and a plurality of receiver select means for selectively connecting output terminals of said each antenna select means to said fixed-reception receiver and said scanning-reception receiver, said each antenna select means selecting one or more of said antenna elements of the group connected thereto and connecting them to said output terminals.

4. The apparatus of claim 3, wherein each of said plurality of receiver select means comprises a plurality of change-over switches connected to the output terminals of said each antenna select means, and a plurality of group select means having their output terminals connected to input terminals of said fixed-reception and scanning-reception receivers and provided with a plurality of input terminals, and wherein each of said change-over switches is capable of selectively connecting output terminals of said antenna select means connected thereto to any one of said plurality of group select means through their different input terminals, and said each group select means is capable of selectively connecting one or more of its input terminals to its output terminal.

5. The apparatus of claim 1, wherein said antenna element select means comprises a plurality of receiver select means connected to said antenna elements, respectively, and a plurality of antenna select means having their output terminals connected to input terminals of said fixed-reception and scanning-reception receivers and provided with input terminals of the same number as that of said antenna elements, and wherein each of said receiver select means is capable of selectively connecting said antenna elements connected thereto to the corresponding input terminals of said plurality of antenna select means, and each of said antenna select means is capable of connecting its one or more input terminals to its output terminal.

6. The apparatus of claim 1, wherein said array antenna is formed with antenna elements arranged in a circumferentially layered form, said apparatus further comprising: means by which, letting the azimuth be represented by $\phi$ and the position in a direction parallel to the axis of said circumferentially layered form by Z, an interference observation value $E(\phi, Z)$ is Fourier transformed for Z to obtain $\Gamma(\phi, \Psi)$ (where $\Psi$ is an elevation angle); and means by which, setting $\theta=\pi/2-\Psi$, $$V(\phi', \theta)=\int W(\phi)\exp(-j2\pi \sin \theta \cos \phi/\lambda)\Gamma(\phi+\phi', \theta)d\phi$$

is calculated to obtain a reconstructed hologram image, where $\int$ is from $-\pi/2$ to $\pi/2$, $\lambda$ is the wavelength of the received radio wave, $W(\phi)$ is a weighting function and $\phi'$ is a noted azimuth.

7. A radio hologram observation method comprising the steps of:
   (1) connecting at least one of antenna elements of an array antenna to a fixed-reception receiver, and sequentially connecting the other antenna elements of said array antenna to a scanning-reception receiver;
   (2) causing interference between the output from said fixed-reception receiver and the outputs from said scanning-reception receiver one after another to obtain a first sequence of interference observation data and storing it in storage means;
   (3) connecting a different antenna elements to said fixed-reception receiver; and
   (4) sequentially connecting the other antenna elements to said scanning-reception receiver and causing interference between the output from said fixed-reception receiver and the outputs from said scanning-reception receiver one after another to obtain a second sequence of interference observation data and storing it in storage means.

8. The method of claim 7, further comprising the steps of:
   (5) connecting either one of said antenna element connected to said fixed-reception receiver in said step (1) and said antenna element connected to said fixed-reception receiver in said step (3) to said fixed-reception receiver and connecting the other antenna element to said scanning reception receiver, and causing interference between the outputs from said fixed-reception and scanning-reception receivers to obtain interference observation data for calibration use; and
   (6) normalizing the phase of either one of said first and second sequences of interference observation data by said interference observation data for calibration use to make the phase references of said first and second sequences of interference observation data common to each other.

9. The method of claim 8, wherein the number of antenna elements connected to said fixed-reception receiver in said step (1) is plural, and a relatively narrow main lobe is formed in a synthetic antenna directional pattern of said plural antenna elements, and wherein the number of antenna elements connected to said fixed-reception receiver in said step (3) is plural, and a main lobe of a synthetic antenna directional pattern of said plural antenna elements lies in substantially the same direction as said main lobe.

10. The method of claim 9, wherein said step (1) is preceded by a step of detecting the direction of arrival of a stable direct wave by means of said array antenna and at least said fixed-reception receiver and setting said main lobe in substantially the same direction as that of arrival of said direct wave.

11. The method of claim 10, wherein: the antenna elements of said array antenna are divided into a plurality of groups; in said step (1), an antenna element in the direction of arrival of said direct wave and antenna elements on both sides of said antenna element in the same group are selectively connected to said fixed-reception receiver; and in said step (3), antenna elements of a group different from that of said antenna element in the direction of arrival of said direct wave and lying on both sides of said antenna element in the direction of said direction of arrival of direct wave are selectively connected to said fixed-reception receiver.

12. The method of claim 8, wherein said array antenna is a ring-shaped one having a radius r, and wherein, letting the number of antenna elements of said array antenna be represented by N, the element number by n, the wavelength of the received radio wave by $\lambda$, and an equivalent radius taking into account the zenith angle $\theta$ by r' (r'=r sin $\theta$), and setting $\phi=2n\pi/N$, $\phi'=2n'\pi/N$, $\phi'$ is set, then interference observation data in each n direction of $\phi'=\pm\pi/2$ is read out of said storage means, and $$V(\phi') = \int_{-\pi/2}^{\pi/2} W(\phi)\exp(-j2\pi' \cos\phi/\lambda) \cdot E(\phi + \phi') d\phi$$

$$W(\phi)=(1/\pi)(1+\cos(2\phi))$$

is calculated, and $V(\phi')$ is calculated while sequentially changing $\phi'$ to reconstruct a hologram.

* * * * *